May 5, 1964
W. L. ROGERS
3,131,497
ANIMATED TALKING FIGURES
Filed May 20, 1960
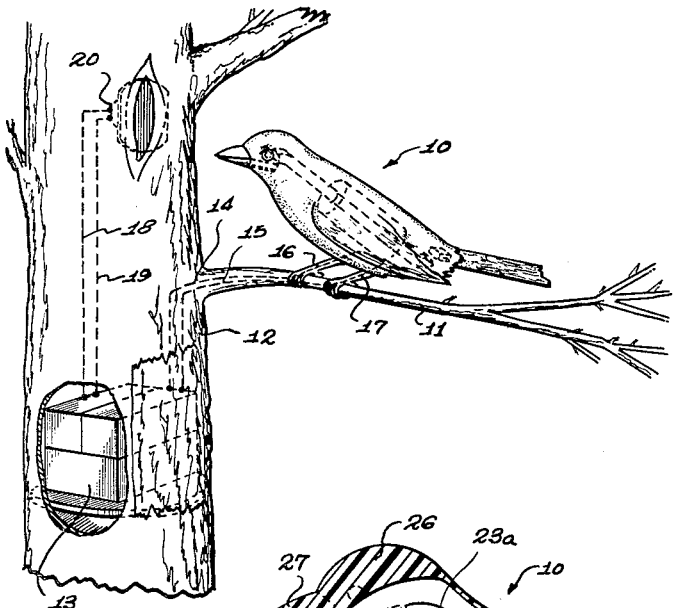
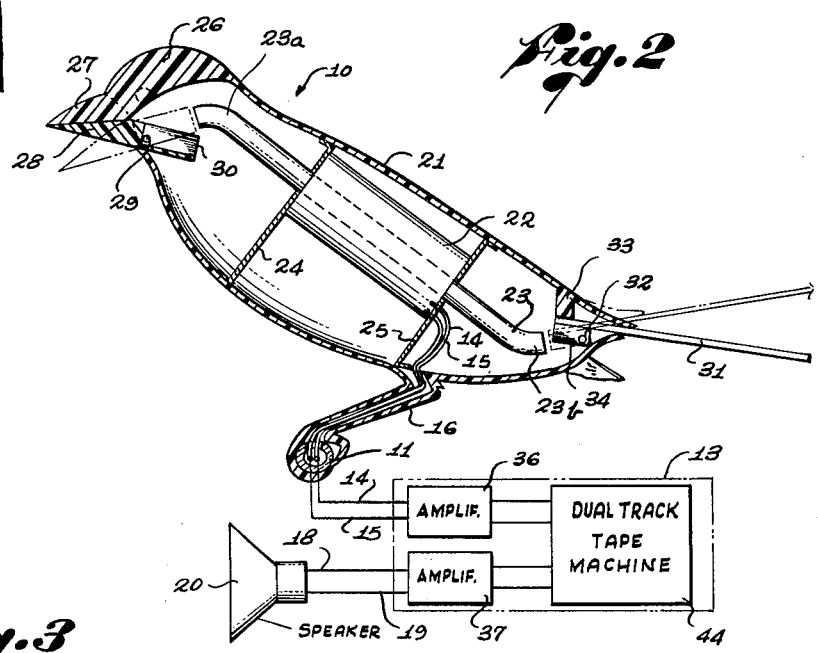
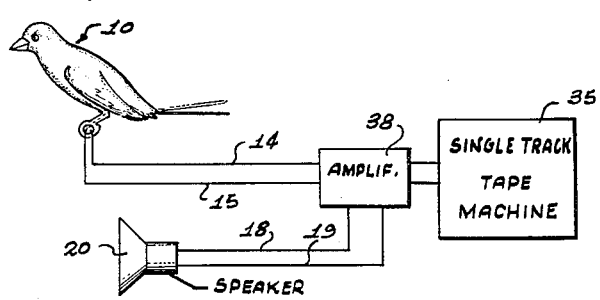
INVENTOR.
WATHEL L. ROGERS
BY
Attorneys

United States Patent Office 3,131,497
Patented May 5, 1964

3,131,497
ANIMATED TALKING FIGURES
Wathel L. Rogers, San Fernando, Calif., assignor to Wed Enterprises, Inc., Burbank, Calif., a corporation of California
Filed May 20, 1960, Ser. No. 30,668
2 Claims. (Cl. 40—28.3)

This invention relates to an animated vocal figure such as a doll provided with means to cause synchronized animation and vocalization. More particularly, this invention relates to a simplified and improved means for causing motion of a member of such a figure in unison with a vocal program generated for the figure.

The invention is particularly adapted to small figures such as birds, animals, and the like. However, it will be understood that the figure may in general represent any desired character, human or animal. In any type of animated figure the present invention may be used to simplify the mechanism thereof and is particularly well adapted to instances where it is necessary to cause simultaneous motion of two oppositely positioned members of the figure.

It is therefore an object of this invention to provide an improved animated vocal figure.

It is yet another object of this invention to provide for such a figure electromagnetic means for directly actuating a pivotally mounted member.

It is a further object of this invention to provide for such a figure electronic control means for synchronizing the animation and vocalization of the figure.

It is a more particular object of this invention to provide such apparatus of a size and nature suitable for use in a figure representing a bird which can be mounted in a tree, bush, or other natural habitat as a display or attraction in amusement parks or the like.

Other objects, features, and advantages of the present invention will be more fully apparent to those skilled in the art from the following detailed description taken in connection with the accompanying drawing in which like reference characters refer to like parts throughout and wherein:

FIGURE 1 is a perspective view partially broken away showing the manner in which a figure of a bird and the control apparatus therefor may conveniently be mounted in an artificial tree or the like.

FIGURE 2 is a central longitudinal section through the figure of the bird shown in FIGURE 1 and a block diagram of the apparatus used to control actuation of the bird.

FIGURE 3 is a block diagram of an alternative embodiment of control apparatus for the animated figure.

Turning now to the drawings and in particular to FIGURE 1 thereof, there is shown generally at 10 an artificial figure representing a bird sitting on the branch 11 of an artificial tree 12. As shown in FIGURE 1, a cabinet 13 housing the vocalization and control circuitry is mounted inside the hollow trunk of the tree 12. From the cabinet 13 a first pair of wires 14 and 15 extend upwardly through the hollow branch 11 and the legs 16 and 17 of the bird 10 to the actuating mechanism inside the bird which will be described in greater detail below.

A second pair of wires 18 and 19 extend upwardly through the trunk of the three from the housing 13 to a speaker 20.

Of course it will be understood that although the bird 10 has been shown mounted on an artificial tree which is hollow at least in part so as to contain the audio and control apparatus associated with the bird, it is also possible to mount the bird 10 in a natural tree and to position the associated housing 13 and speaker 20 under any suitable camouflage at the base of or near the tree or even to mount the speaker and housing in the upper portions of the natural tree.

The essential features of the construction of the figure of the bird and its associated control equipment can be seen in greater detail in FIGURE 2. It will be noted that the bird 10 comprises a hollow body member 21 which is shown as being formed from plastic material but which may be constructed in any suitable manner as by stretching feather bearing cloth or fabric over any suitable framework.

Depending from the body 21 of the bird 10 are the hollow legs 16 and 17 which at their ends are provided with any suitable means to secure the figure of the bird to the branch 11. The wires 14 and 15 continue on through the hollow legs 16 and 17 of the bird and are connected to energize the coil 22 surrounding the soft iron core 23 which cooperates with the coil 22 to form the electromagnetic actuator for the movable members of the bird. The core 23 and coil 22 are conveniently mounted between brackets 24 and 25 inside the bird 10 which also afford reinforcement for the central portion of the hollow body 21 of the bird.

This body 21 is provided integrally with a head 26 having an upper break member 27 rigidly and fixedly attached thereto. Cooperating with the upper beak member 27 is a lower beak member 28. The lower beak member 28 is pivotally mounted for rotation about any suitable pivot means such as the pin 29 which extends between and is mounted upon opposite interior surfaces of the hollow body of the bird.

The lower beak member 28 may as a whole be formed of any suitable or desirable material but is provided at its inner end with an insert portion 30 thereof which is formed of soft iron or other magnetically responsive material. This soft iron insert member 30 of the lower beak member 28 serves a dual function. When the core 23 of the electromagnet is deenergized, the weight of portion 30 is such that the beak member 28 is urged by gravity to the solid line position shown in FIGURE 2 wherein the upper surface of the beak member 28 rests against and is stopped by the upper beak member 27 so that the bird gives the impression of having its mouth closed.

It will be noted that the core 23 of the electromagnet has a curved upper terminal portion 23a terminating in a pole face. The main portion 23 of the electromagnetic core extends substantially along the longitudinal axis of the body of the bird. The upper terminal portion 23a of the core is bent or curved away from this axial direction so that its axis points generally in the direction of a line extending out of the mouth of the bird. When an electrical current is supplied to the coil 22 of the electromagnet over the wires 14 and 15 in a manner to be described in detail below, the core 23 and terminal portion 23a become magnetized and exert a magnetic attraction on the soft iron insert member 30 of the lower beak 28. This attraction causes the pivotally mounted lower beak member 28 to rotate about the pivot point 29 against the biasing force of gravity to thereby assume the dotted line position shown in FIGURE 2 wherein the insert member 30 is axially aligned with the curved end portion 23a of the core 23. As soon as the current is cut off, the core 23 becomes demagnetized and in the absence of the magnetic force acting on the lower beak 28, this beak is urged by gravity back to the solid line position in which the bird's mouth is closed.

It will thus be seen that whenever an electrical current of appropriate magnitude is supplied to the coil 22 of the electromagnet, the core 23 thereof is energized to directly actuate the lower beak of the bird's mouth so as to open the mouth. Similarly, whenever the electromagnet is deenergized, the magnetic force on the lower beak member is removed and this pivotally mounted lower beak member is urged by gravity back to the closed mouth position.

The tail 31 of the bird 10 is also pivotally mounted for rotation about the pin 32. In the solid line position shown in FIGURE 2 the tail is urged by gravity into a position wherein its larger outer portion is pulled downwardly as far as is possible by rotation about the pin 32 seating the upper inner surface against a stop member 33 provided inside the bird. In the case of the tail member, the magnetically responsive portion 34 of the tail which is inside the body of the bird is lighter in weight than the longer portion of the tail extending outside of the bird so that gravity will bias the tail to the downward position shown in solid lines in FIGURE 2.

It will be noted that the lower end portion of the core 23 of the electromagnet curves away from the main axial direction in a direction opposite to that in which the upper portion 23a curves and terminates in a pole face. That is to say, the lower portion 23b curves away from the axial direction of the main portion 23 so that the lower end of the core points in a direction extending generally along the position which it is desired that the tail will assume when the electromagnet is actuated.

This position to be assumed by the tail when the electromagnet is energized is shown by the dashed line position of the tail member in FIGURE 2. That is to say, when electrical energy is supplied to the coil 22, the core 23 and terminal portion 23b thereof become magnetized and attract the magnetically responsive portion 34 of the tail 31 to a position in which it is axially aligned with the end portion 23b. The force of magnetic attraction overcomes the biasing force of gravity and pulls the member 34 downwardly, thereby rotating the tail member 31 about the pivot point 32 so that the external portion of the tail 31 is raised to the dashed line position. This action of course occurs simultaneously with the energization of the lower beak member so that whenever a current is supplied to the coil 22, the tail member 31 of the bird is raised and the lower beak member 28 of the bird is lowered to thereby open the mouth of the bird.

The control apparatus which determines the supply of the current is such that when the coil 22 is energized to open the mouth of the bird and raise the tail of the bird, there will simultaneously be provided an audio program representing the vocalization of the bird or other figure.

The vocalization and animation circuitry within the housing 13 may utilize either a dual parallel track magnetic tape machine 44 in the circuit as shown in FIGURE 2, or it may utilize a single track magnetic tape machine 35 in the circuit as illustrated in FIGURE 3.

With reference to FIGURE 2, it will be noted that the dual track machine 44 has a first output connected to a suitable amplifier 36, the output of which is in turn supplied over wires 14 and 15 to actuate the electromagnet in the bird, and a second output which is supplied through a suitable amplifier 37 and thence over wires 18 and 19 to the speaker 20. Of course it will be realized that a pre-recorded magnetic tape is repeatedly played by the machine 34. In the arrangement shown in FIGURE 2, the tape used has two parallel or side-by-side tracks, the recorded signals on which are picked up by a pair of transducer heads. The first track has a control signal recorded thereon and serves to provide the desired animation of the bird. The second track has the audio program or vocalization signal recorded thereon and serves to actuate the speaker 20. In the dual track system shown in FIGURE 2, the separate amplifiers 36 and 37 can, if necessary, have different gains so that the power output can be individually adjusted according to the requirements of their respective loads. Furthermore, the dual track separate amplifier system has the advantage that the magnitude and duration of the control signal can be varied in any manner desired and is not entirely predetermined by the nature of the audio program vocalization signal.

However, the system can be somewhat simplified as shown in the embodiment of FIGURE 3 which is adequate and suitable for most applications. In FIGURE 3, a single track tape recorder and playback mechanism of any commonly available type is indicated at block 35. The single track of the magnetic tape continuously played and replayed by this machine has recorded thereon only the signals representing the desired audio program which in the present instance would be the natural song or call of the particular bird represented by the FIGURE 10.

The output of the single track tape machine 35 is supplied to power amplifier 38 which in turn has two parallel connected outputs. A first of these outputs is supplied over wires 18 and 19 to apply the audio program signal to the speaker 20 to thereby reproduce the vocalization of the bird. The second of these outputs is applied over lines 14 and 15 so that an electrical signal having the same wave shape as that applied to the speaker 20 is also applied to the coil 22 of the electromagnetic animation mechanism of the bird. In practice it has been found that the normal variation in signal amplitude which occurs in the audio program does not adversely affect the animation of small figures such as the bird shown herein since the pivotally mounted moving members are relatively light and are directly actuated by the electromagnet. This direct actuation and light weight result in a relatively small inertia to be overcome and is therefore a relatively small load on the power amplifier 38. Since the animation load is with the present type of construction relatively small, it has been found that it can be driven directly from the power amplifier which also drives the speaker 20 without overloading a speaker of reasonable size. If desired, however, it will also be understood that a potentiometer or other power reducing means could be inserted between the speaker 20 and the power amplifier 38.

In either embodiment, it will be apparent that I have provided an animated vocal figure of simple and foolproof construction which can effectively represent birds, animals, or other figures in either artificial or natural surroundings. The device is adapted for use either as an individual novelty in the home or as a part of the display of an amusement park or the like.

While a particular exemplary preferred embodiment of the invention has been described in detail above, it will be understood that modifications and variations therein may be effected without departing from the true spirit and scope of the novel concepts of the present invention as defined by the following claims.

I claim:

1. In combination with a source of successive electric signals of various magnitudes and durations, an animated figure comprising:

a hollow body in the form of an animate figure;

electromagnetic actuating means within said body and including a stationary magnetizable core having a pair of oppositely disposed pole faces, said means being energizable by said source of signals to develop a magnetic field adjacent said pole faces, the strength and duration of said field varying in correspondence with the magnitudes and durations of the signals from said source;

a pair of members pivotally mounted to said body and each including an exterior portion extending outwardly of said body, and an interior portion within said body and made of magnetically responsive material, each of said members being pivoted on an axis disposed between said interior and exterior portions, said interior portion being unbalanced relative to the exterior portion and having a pivotal arc of travel adjacent but spaced from its corresponding pole face and sweeping through the magnetic field, said interior portion being normally disposed in a position along said arc of travel out of alignment with its corresponding said pole face and pivotable to a position closer to said pole face upon development of said magnetic field, the duration and degree of proximity between said interior portion and said pole face corresponding to the duration and strength of said field and the period of oscillation of said interior portion as it seeks a position of magnetic equilibrium;

and said electrical signals being derived from a control program recorded on a recording apparatus.

2. In combination with a source of successive electric signals of various magnitudes and durations, an animated figure comprising:

a hollow body in the form of a bird;

electromagnetic actuating means within said body and including an elongated stationary magnetizable core having a pair of oppositely disposed pole faces, said means being energizable by said source of signals to develop magnetic fields adjacent said pole faces, the strength and duration of said fields varying in correspondence with the magnitudes and durations of the signals from said source;

first and second members pivotally mounted to said body, said first member including an exterior portion extending outwardly of said body in the form of a lower beak for said bird, and an interior portion within said body and made of magnetically responsive material, the first member being pivoted on an axis between the interior and exterior portions, said second member including an exterior portion extending outwardly of said body in the form of a tail for said bird, and an interior portion within said body and made of magnetically responsive material, the second member being pivoted on an axis between the interior and exterior portions, said interior portions having pivotal arcs of travel adjacent but spaced from said pole faces, respectively, and sweeping through said magnetic fields thereof, each of said interior portions being unbalanced relative to the external portion and biased to a position along said arc thereof relatively distant from the associated said pole face, said interior portions being simultaneously pivotable to positions closer to said pole faces upon development of said magnetic fields, the duration and degree of proximity between said interior portions and said pole faces corresponding to the duration and strength of said fields and the period of oscillation of said interior portions as they seek positions of magnetic equilibrium whereby said body is apparently animated by the beak-like said exterior portion and the tail-like said exterior portion;

and said electrical signals being derived from a control program recorded on a recording apparatus.

References Cited in the file of this patent

UNITED STATES PATENTS

| | | |
|---|---|---|
| 2,322,668 | Selvage | June 22, 1943 |
| 2,629,966 | Russ | Mar. 3, 1953 |
| 2,867,049 | Brackensey | Jan. 6, 1959 |
| 2,890,535 | Kenworthy | June 16, 1959 |